United States Patent [19]

Stankewitz

[11] Patent Number: 5,708,526
[45] Date of Patent: Jan. 13, 1998

[54] PROCESS AND DEVICE FOR CONTRASTING OBJECTS TO BE MICROSCOPICALLY EXAMINED

[75] Inventor: Hans-Werner Stankewitz, Wetzlar, Germany

[73] Assignee: Leica Mikroskopie und Systeme GmbH, Wetzlar, Germany

[21] Appl. No.: 428,130

[22] PCT Filed: Sep. 15, 1993

[86] PCT No.: PCT/DE93/00858

§ 371 Date: Apr. 28, 1995

§ 102(e) Date: Apr. 28, 1995

[87] PCT Pub. No.: WO94/10597

PCT Pub. Date: May 11, 1994

[30] Foreign Application Priority Data

Oct. 30, 1992 [DE] Germany .............. 42 36 803.0

[51] Int. Cl.[6] .................. G02B 21/06; G02B 26/02; G02B 5/22

[52] U.S. Cl. .............. 359/386; 350/227; 350/371; 350/888

[58] Field of Search .............. 359/368–371, 359/385–388, 227, 234–236, 888

[56] References Cited

U.S. PATENT DOCUMENTS

| | | | |
|---|---|---|---|
| 2,637,243 | 5/1953 | Marx | 359/370 |
| 3,743,390 | 7/1973 | McCarthy et al. | 359/888 |
| 5,016,981 | 5/1991 | Peppers et al. | 359/888 |

FOREIGN PATENT DOCUMENTS

| | | |
|---|---|---|
| 811 736 | 6/1951 | Germany. |
| 1963604 | 2/1971 | Germany. |
| 82 19 123 | 10/1982 | Germany. |
| 673861 | 6/1952 | United Kingdom. |

OTHER PUBLICATIONS

E. Courtens et al., "Microscope Attachment for Improved Visibility of Weak Phase Objects", IBM Technical Disclosure Bulletin, vol. 22, No. 11, Apr. 1980, p. 5085.

T. Noda et al., "Separation of Phase and Absorption images in Phase-Contrast Microscopy", Journal of the Optical Society of America, vol. 9, No. 6, Jun. 1992, pp. 924–931.

*Primary Examiner*—Thong Nguyen
*Attorney, Agent, or Firm*—Foley & Lardner

[57] ABSTRACT

A contrasting process and device allows a relief contrast to be obtained for microscopic amplitude and/or phase objects. The input aperture (L') of the condenser (2) is partially and asymmetrically masked at the same time as an image (S') of a sector diaphragm (S) is generated in the output aperture (L") of the objective lens (3), a phase segment (8) of a phase plate (7) covering the image (S') at least partially. The size of the phase segment (8) may be adapted to the size of the image (S') cutout; it may however also be substantially smaller. In the latter case, the sector diaphragm (5) may have additional attenuating sectors (D) made of semi-transparent material with a defined attenuating factor, for example 15%. The process and device are suitable for transmitted light and/or reflected light microscopy in a normal or inverted beam path.

6 Claims, 1 Drawing Sheet

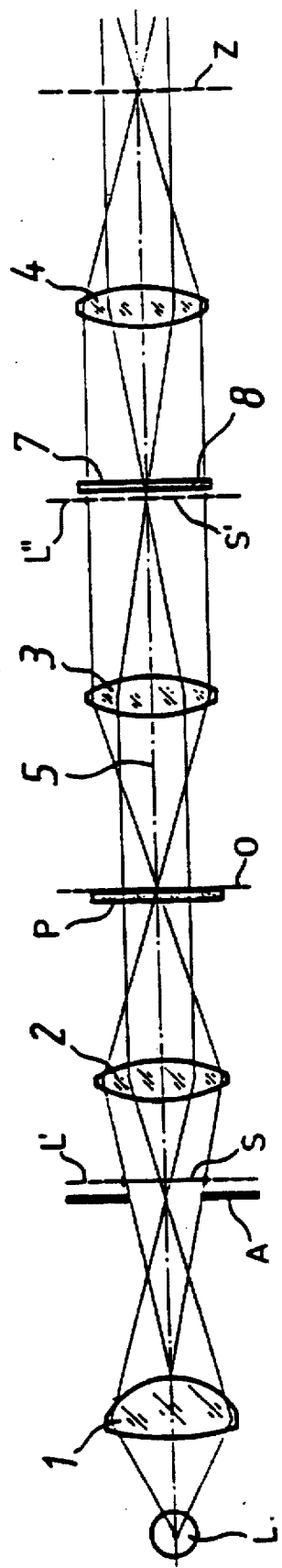
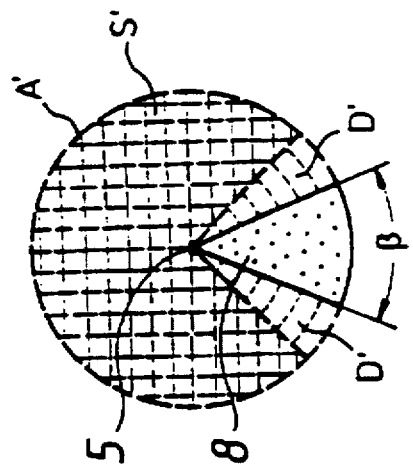
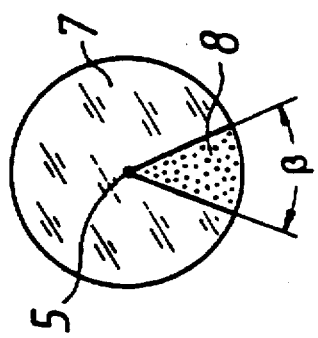
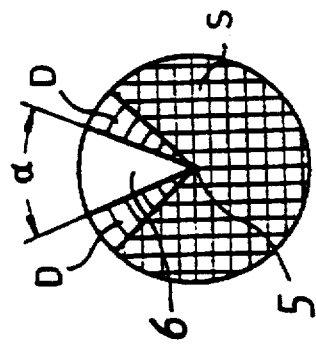

PROCESS AND DEVICE FOR CONTRASTING OBJECTS TO BE MICROSCOPICALLY EXAMINED

FIELD OF THE INVENTION

The invention relates to an optical contrasting process for amplitude and/or phase objects to be microscopically examined.

RELATED ART

The microscopic examination of objects, in particular of living, uncolored cell and tissue materials or of colorless, transparent materials having object regions of different optical thickness requires contrast processes with the aid of which a better detectability of object structures can be achieved for the human eye.

Thus, it is known, for example, to achieve an "oblique illumination" in the illuminating section of a microscope by displacing the aperture diaphrag eccentrically from the optical (illuminating) axis. The disadvantages of these known contrasting processes consist in that they are difficult to reproduce, not cost effective to realize and have to be readjusted for each objective.

A further known process is the phase-contrast process. Contrast effects are produced in this case by inserting suitable optical means into the rear focal plane of the objective. Since pure phase objects change only the phase and not the amplitude of the light, while the human eye and the photographic plate respond to amplitude differences but not to phase differences, they remain invisible in the normal bright field image. With the aid of the known phase-contrast process, the phase differences caused by the (phase) objects are "converted" into amplitude differences and thereby rendered visible. Zernike realized that the phase of the illuminating light needed to be changed only by $\lambda/4$ in order to cancel the difference between a phase object and an amplitude object, that is to say to render phase structures visible just like amplitude structures. In practice, use is made of an annular platelet, the so-called "phase ring", which is positioned in the rear focal plane of the objective. The phase ring has a defined thickness and absorption. The application of a phase ring assumes that the illuminating light comes from an annular light source. This is achieved in structural terms by a diaphragm mounted in the region of the condenser. Since the diameter and the width of this diaphragm influence the illumination aperture, which must be at a specific ratio relative to the objective aperture, a known phase-contrast condenser contains a plurality of annular diaphragms which are conjugate with respect to the objectives and are arranged, for example, on a turret plate. The disadvantages thus consist in that a specially configured annular diaphragm must be present for each microscope objective and must be brought into the operating position. In addition, no "relief effect" can be achieved, and finally the process experiences disturbances, for example when examining liquid chambers.

Further known contrasting processes relate to the modulation contrast according to Hoffman. The high cost of production is disadvantageous, since special objectives have to be used which are not rotationally symmetrical. This process is, moreover, difficult to manipulate.

Finally, mention should be made of the interference contrast process which is, however, based on the use of optical polarization components of complicated crystal-optic orientations, which makes it very expensive in terms of production engineering and thus cost intensive. Moreover, it is not possible with this known process to examine objects which are located, for example, in plastic specimen containers, since plastic materials influence the polarization states.

SUMMARY OF THE INVENTION

It is therefore the object of the present invention to avoid the disadvantages of the known processes and to specify a combined optical contrasting process which permits a larger scope of application for all objects coming into consideration in conjunction with ease of operation, it being the case that relief contrasting takes place in addition to phase contrasting. The object consists, furthermore, in specifying a corresponding device in which no optical polarization components are used.

The object is achieved according to the invention in the case of a process of the type mentioned at the beginning by means of the characterizing feature of the main claim.

It is, furthermore, achieved in the case of a device of the type mentioned at the beginning by means of the characterizing features of Patent Claim 3. Advantageous embodiments follow from the subclaims.

BRIEF DESCRIPTION OF THE DRAWINGS

The invention is now explained in more detail with the aid of the figures, in which FIG. 1a shows a diagrammatic representation of a part of the illuminating and imaging beam path of a microscope;

FIG. 1b shows a plan view of a sector diaphragm according to the invention;

FIG. 1c shows a plan view of a phase plate according to the invention; and

FIG. 2 shows the image of the sector diaphragm at the location of the phase plate according to the invention, with phase segment orientated in an azimuthally correct fashion.

DETAILED DESCRIPTION OF THE PREFERRED EMBODIMENT

A part of an illuminating and imaging beam path in a microscope is represented diagrammatically in FIG. 1a. The illuminating beam, whose axis coincides with the optical axis 5, proceeds from a light source L and after traversing a collector 1 passes firstly through an aperture diaphragm A, constructed as an iris diaphragm, then through a condenser 2, and finally impinges on a transmitted-light object which is to be examined microscopically and is denoted in the figure as specimen P. Expressed more exactly, P is a specimen holder, for example a plane-parallel slide, on whose central area, which is penetrated by the optical axis 5, the actual specimen is located in the object plate 0. This specimen can be a pure amplitude object or a pure phase object or a mixed form of the two object categories. After leaving the object, the illuminating and imaging beam passes through an objective 3 and then through a tube lens 4. The optical geometry of this design is known per se.

To this extent, FIG. 1a corresponds to a Köhler illumination system. However, it may be stressed at this juncture that other illumination systems, for example a so-called "critical illumination", can also be the basis for the structural arrangement of the individual optical components required.

L' denotes the front focal plane of the condenser 2; it is also termed the "entrance pupil" of the condenser 2. The abovementioned aperture diaphragm A is located in or in the immediate vicinity of the condenser entrance pupil. L' denotes the rear focal plane of the objective 3; it is also termed the "exit pupil" of the objective 3. Z denotes an intermediate image plane, the planes L', O, L' and Z representing conjugate planes. A microscope eyepiece (or a ground glass screen or a display screen) completes the illuminating and imaging system. However, for reasons of simplification it is not represented in the drawing.

As represented in FIG. 1b, the sector diaphragm S according to the invention is located in the front focal plane L' of the condenser. By comparison with FIG. 1a, FIG. 1b shows a diaphragm folded over into plane of the drawing. The trace of the optical axis 5 represents the center of the circle. The sector diaphragm 5 has a (circular) "sector" 6 whose angle is denoted by α. In the case represented, two symmetrically arranged attenuation sectors D are located on both sides of the sector 6. The significance thereof will be considered in more detail further below. In principle, the sector diagram S according to the invention can be produced without the additional attenuation sectors D. In this case, it thus consists only of a circular disk which is made from opaque material and—as already mentioned—has a sector 6 having an angle α.

In the rear focal plane L" of the objective 3, or in the immediate vicinity thereof, there is located, furthermore, a phase plate 7 structured in accordance with the invention.

It is represented in FIG. 1c—once again folded over by 90 degrees into the plane of the drawing. It consists of a circular plane-parallel disk made from transparent material (for example glass) and has a sector-shaped region, which is denoted as phase segment 8. The sector angle is specified as β. The phase coating is known per se. It can, for example, be an $MgF_2$ coating layer, such as is also used in the known phase rings. This phase segment 8 exerts a specific influence on the penetrating beam with respect to its phase angle and with respect to its intensity. The overall arrangement can be made in such a way that the image of the sector 6 corresponds with regard to its area and its angle α with the area and the angle β of the phase segment 8. It is, however, also possible for the phase segment 8 to be smaller or larger than the image of the sector 6. Furthermore, it is possible for the azimuthal orientation of the phase plate 7 to be arranged such that the phase segment 8 does not come to lie symmetrically in the sector of the image S'.

Reference is made to FIG. 2 for a more detailed illustration. The figure shows—to a somewhat larger scale than in the case of FIGS. 1b and 1c—the image A' of the aperture diaphragm A projected onto the rear focal plane L", compare the dashed circular arc A'. Since the phase plate 7 is also located at the location of the rear focal plane L" together with its phase segment 8, this segment 8 is represented with its sector angle β hatched with dots. The broken network hatching represents the image S' of the sector diaphragm S. As already mentioned further above, the two sector regions denoted by D can initially be regarded as eliminated in FIG. 2.

If, for example, use is now made of a sector diaphragm S having a relatively large sector 6, and at the same time of a phase plate 7 having a relatively small sector of the phase segment 8, so that it holds that α>β, the phase segment 8 will come to lie in a representation in accordance with FIG. 2 inside the—larger—sector image. This means that—assuming symmetrical positioning—two free, bright, sector-shaped regions occur on both sides of the phase segment 8. Of course, an asymmetrical positioning of the phase segment 8 with respect to the sector image is also possible; in such a case, the bright sector part will be larger on one side of the phase segment (and thus have a larger angle), than that on the other side of the phase segment. In the case of extremely asymmetrical positioning as a consequence of a corresponding azimuthal rotation of the phase plate 7, it is also possible, of course, for the phase segment 8 to leave free a bright sector part only on one side of the sector of the image S'.

In order in such cases to soften, that is to say to "attenuate", instances of excessive halation in the plane L" due to the two bright sector parts, the sector diaphragm can additionally be equipped with attenuation sectors D (compare FIG. 1b), which consist of transparent material of defined transmissivity. These can be neutral density filters or color filters. With regard to the degree of attenuation (degree of light attenuation), they are adapted to that of the phase segment 8, for example. The light attenuation factor is 15%, for example, in one embodiment of the present invention.

This optional additional equipping of the sector diaphragm S, which is opaque per se, with two semi-transparent sectors D on both sides of the sector-shaped opening 6 produces the image shown in FIG. 2 (with superimposed phase segment 8). D' denotes the image of two attenuation sectors D. According to a particularly preferred embodiment of the present invention, the geometric sector diaphragm is dimensioned in such a way that ⅚ (five sixths) of the condenser pupil is masked out.

Owing to the fact that the sector diaphragm S is a "sector" 6 which by definition reaches up to the center of the circle (=trace of the optical axis 5), it is independent of the focal length of the respective condenser or objective. The application is so insensitive with respect to pupil fluctuations that the phase segment 8 can also be mounted at an average value of the conjugate object pupil. This results in the important advantage that it is possible to use normal objectives of different focal lengths and pupil positions.

Although the process and the device according to the invention have been explained with the aid of a transmitted-light beam path, reflected-light arrangements can also be equipped in a corresponding way with the sector diaphragm/phase segment combination according to the invention. This combined relief and phase contrasting process can, moreover, also be applied for inverse microscope beam controls in transmitted light and/or reflected light.

LIST OF REFERENCE SYMBOLS AND REFERENCE NUMERALS

A—Aperture diaphragm
A'—Image of (A)
D—Attenuation sector (s)
D'—Image(s) of (D)
L—Light source
L'—Front focal plane ("entrance pupil") of (2)
L"—Rear focal plane ("exit pupil") of (3)
O—Object plane
P—Specimen
S—Sector diaphragm
S'—Image of (S)
Z—Intermediate image plane
α—Angle of (S)
α'—Angle of the image of (6)
β—Sector angle of (8)
1—Collector
2—Condenser
3—Objective
4—Tube lens
5—Optical axis
6—Sector of (S)

7—Phase plate
8—Phase segment of (7)

We claim:

1. A device for contrasting objects to be microscopically examined, comprising:
   a condenser,
   an objective,
   a sector diaphragm (S) having a circular diaphragm with a sector-shaped opening with an opening angle of $\alpha$ arranged in a front focal plane of the condenser,
   a phase plate having a sector-shaped phase segment with a sector angle provided in a rear focal plane of the objective,
   wherein:
   a) a partial, asymmetrical masking of an entrance pupil (L') of the condenser is performed by the sector diaphragm (S), and an image (S') of the sector diaphragm (S) is covered at least partially by the sector-shaped phase segment,
   b) the image (S') is produced in an exit pupil (L") of the objective, and
   c) the sector diaphragm (S) has at least one sector area (D) adjacent to the sector-shaped opening which produces an attenuation of an intensity of an illumination light beam such that a partial area of said image (S') of the sector diaphragm (S) on the phase plate is not masked by the sector-shaped phase segment.

2. A device as recited in claim 1, wherein the sector area (D) whose image (D') is not masked by the sector-shaped phase segment is made transparent, while the sector area (D) weakens the intensity of the illuminating light beam.

3. A device as recited in claim 1, further comprising a light source, a collector, an aperture diaphragm, and a tube lens.

4. A device as recited in claim 1, wherein the sector diaphragm (S) masks out approximately ⅚ (five-sixths) of the entrance pupil (L').

5. A device as recited in claim 1, wherein the phase plate is azimuthally positioned in such a way that the sector-shaped phase segment is symmetrically arranged with respect to the image (S') of the sector-shaped diaphragm opening.

6. A device as recited in claim 1, wherein the area of the sector-shaped phase segment is between 10% and 50% of the area of the image (S') of the sector-shaped diaphragm opening.

* * * * *